(12) United States Patent
Kitamura

(10) Patent No.: US 6,201,206 B1
(45) Date of Patent: Mar. 13, 2001

(54) METHOD OF DETECTING ABRASION QUANTITY OF WELDING GUN ELECTRODE AND WELDING METHOD

(75) Inventor: Hiroshi Kitamura, Fukuoka (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 09/355,917

(22) PCT Filed: Feb. 4, 1998

(86) PCT No.: PCT/JP98/00459

§ 371 Date: Aug. 9, 1999

§ 102(e) Date: Aug. 9, 1999

(87) PCT Pub. No.: WO98/34753

PCT Pub. Date: Aug. 13, 1998

(30) Foreign Application Priority Data

Feb. 7, 1997 (JP) .................................................. 9-025222

(51) Int. Cl.⁷ .................................................. B23K 11/25
(52) U.S. Cl. ......................................... 219/109; 219/86.61
(58) Field of Search ................................. 219/109, 86.41, 219/86.61, 86.7, 86.8

(56) References Cited

U.S. PATENT DOCUMENTS

| | | | |
|---|---|---|---|
| 4,352,971 | * | 10/1982 | Slade .................................. 219/86.61 |
| 4,841,113 | * | 6/1989 | Hamada et al. ................... 219/86.41 |
| 4,912,294 | * | 3/1990 | Tsujii .................................. 219/86.8 |
| 4,999,475 | * | 3/1991 | Yasuge .............................. 219/86.41 |
| 5,340,960 | * | 8/1994 | Takasaki et al. .................... 219/86.7 |

FOREIGN PATENT DOCUMENTS

| | | |
|---|---|---|
| 7-284957 | 10/1995 | (JP) . |
| 9-150278 | 6/1997 | (JP) . |
| 10-99973 | 4/1998 | (JP) . |
| 10-156546 | 6/1998 | (JP) . |

* cited by examiner

Primary Examiner—Clifford C. Shaw
(74) Attorney, Agent, or Firm—Oblon, Spivak, McClelland & Neustadt, P.C.

(57) ABSTRACT

A plate-shaped jig (9) is fixed between a fixed-side electrode (5) and a moving-side electrode (6). The end of an arm is set to move by an external force in the direction the moving-side electrode (6) moves, and then the moving-side electrode (6) is moved toward the jig (9) and pressed against the jig (9) by such a force that the end of the arm is pushed up by a counterforce, the position of a robot in a tool coordinates system and the position of a gun-axis servomotor (7) are acquired as reference positions when the jig (9) is held between the moving-side electrode (6) and the fixed-side electrode (5) to release the holding of the fixed jig (9) with pressure. Thereafter, similarly, the position of the robot and the position of the gun-axis servomotor (7) are acquired to calculate the wear amount of the fixed-side electrode (5) and the moving-side electrode (6) from the respective differences from the reference positions.

2 Claims, 5 Drawing Sheets

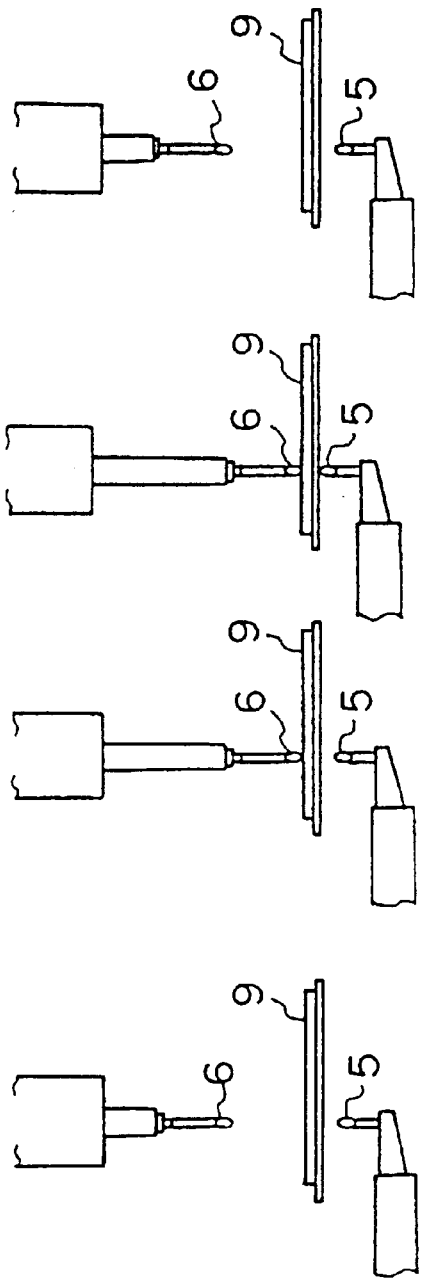

METHOD OF DETECTING ABRASION QUANTITY OF WELDING GUN ELECTRODE AND WELDING METHOD

TECHNICAL FIELD

The present invention relates to a method of detecting wear amount of welding gun electrodes and a welding method in a welding robot having a welding gun attached to an end of its robot arm for holding an object to be welded with a fixed-side electrode and a moving-side electrode opposite to the fixed-side electrode and moving driven by a servomotor or an air cylinder to hold with pressure the object to be welded.

BACKGROUND ART

Conventionally, in a welding robot having a resistance welding gun attached to an end of its robot arm, a moving-side electrode is moved by a driving source such as an air cylinder or a servomotor (gun axis servomotor) to hold an object to be welded together with a fixed-side electrode which forms a pair, the object is held with pressure, and a high-current is passed for performing welding. Since both of the paired electrodes are gradually worn due to pressure and welding heat at welding, it has been necessary to detect amounts of wear of the electrodes during operation of the robot to correct positions of the electrodes.

As a method for correcting positions of the electrodes, an equalizing mechanism (mechanism which is usually fixed, but the fixation is released at the application of pressure to move a welding gun supported by a spring to an optimal position) is provided, or a method described in JP-A-7-284957 is employed.

However, the equalizing mechanism has a disadvantage of being expensive. Additionally, the method in JP-A-7-284957 has a problem that distribution of a wear amount is previously determined, or a wear amount of a fixed-side electrode is obtained by subtracting a wear amount of a moving-side electrode from an entire wear amount (fixed-side electrode plus moving-side electrode), in which the former method is not of high accuracy and the latter method is complicated since it involves a two-step procedure.

DISCLOSURE OF THE INVENTION

It is an object of the present invention to provide a method of detecting wear amount of welding gun electrodes that simply detects wear amounts of electrodes without requiring an equalizing mechanism.

It is another object of the present invention to provide a welding method which eliminates the need for an equalizing mechanism.

The wearing detecting method according to the present invention comprises the steps of:

fixing a plate-shaped jig between the fixed-side electrode and the moving-side electrode;

controlling, before either of the electrodes is worn,the robot such that the end of the arm moves by an external force only in the direction the moving-side electrode moves, then moving the moving-side electrode toward the jig, and after the moving-side electrode comes into contact with the jig, pressing the moving-side electrode against the jig with a constant force such that the end of the arm moves in a direction opposite to the direction in which the moving-side electrode moves with a counterforce;

acquiring a position of the robot and a position of the gun-axis servomotor in a predetermined coordinate system as reference positions respectively when the jig is held between the moving-side electrode and the fixed-side electrode;

acquiring thereafter a position of the robot and a position of the gun-axis servomotor in the coordinate system in a similar manner; and calculating a wear amount of the fixed-side electrode and a wear amount of the moving-side electrode from a difference between the present position of the robot and the reference position of the robot and a difference between the present position of the gun-axis servomotor and the reference position of the gun-axis servomotor, respectively.

The use of a fixed jig with actually pressurized between the moving-side electrode and the fixed-side electrode to detect wear amounts of the electrodes, makes it possible to detect wear amounts with a simple procedure and at a higher accuracy.

A welding method according to the present invention comprises the steps of:

fixing a workpiece between the fixed-side electrode and the moving-side electrode;

controlling the robot such that the end of the arm moves by an external force only in the direction the moving-side electrode moves, then moving the moving-side electrode toward the workpiece, and after the moving-side electrode comes into contact with the workpiece, pressing the moving-side electrode against the workpiece with a constant force such that the end of the arm moves in the direction opposite to the direction in which the moving-side electrode moves with a counterforce;

causing the workpiece to be held between the moving-side electrode and the fixed-side electrode and performing welding; and releasing the holding with pressure for the workpiece to return the moving-side electrode to its original position.

In short, in the method of detecting wear amount of welding gun electrodes, the use of a workpiece as a jig and performing operations except for wear amount detection (position detection) at a higher speed, realizes an equalizing operation. The equalizing operation by a robot eliminates a need of a fixed-side chip to be abutted on a workpiece for teaching, even in a gun having no equalizing mechanism, thus realizing teaching similarly to a gun with an equalizing mechanism. This substantially facilitates teaching and eliminates the need for wear correction. In this case, a driving source for the moving-side electrode may be a gun axis servomotor or an air cylinder.

BRIEF DESCRIPTION OF THE DRAWINGS

FIGS. 5a–5d are view diagram showing motion of fixed-side electrode 5 and moving-side electrode 6.

BEST MODE FOR CARRYING OUT THE INVENTION

Figure 1:
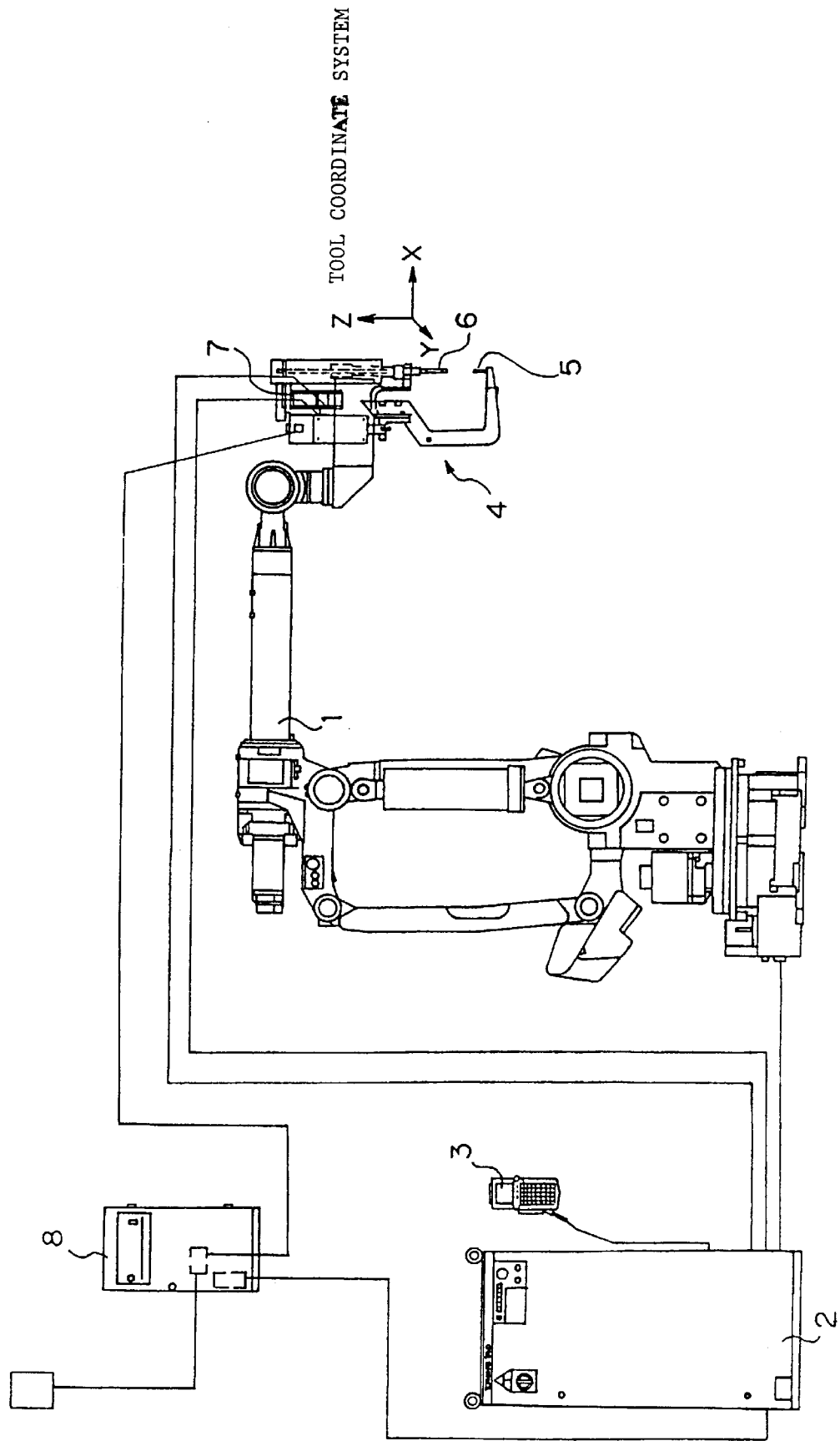
FIG. 1 is a view showing a configuration of a welding robot having a C-shaped welding gun of an embodiment according to the present invention.

As shown in FIG. 1, C-shaped welding gun 4 having fixed-side electrode 5 and moving-side electrode 6 is attached to an end of an arm of industrial robot 1 controlled by a servomotor having a position detector (not shown). Industrial robot 1 is controlled by a robot driving circuit in robot controlling unit 2. Setting of welding conditions such as a welding current into C-shaped welding gun 4 is performed by welding unit 8. Moving-side electrode 6 is driven by gun-axis servomotor 7 controlled by gun motor control section 15 (hereinafter described) in robot controlling unit 2 through a ball screw. Fixed-side electrode 5 is attached to a fixed-side of C-shaped welding gun 4 and is moved vertically with vertical movement of C-shaped welding gun 4.

Figure 2:
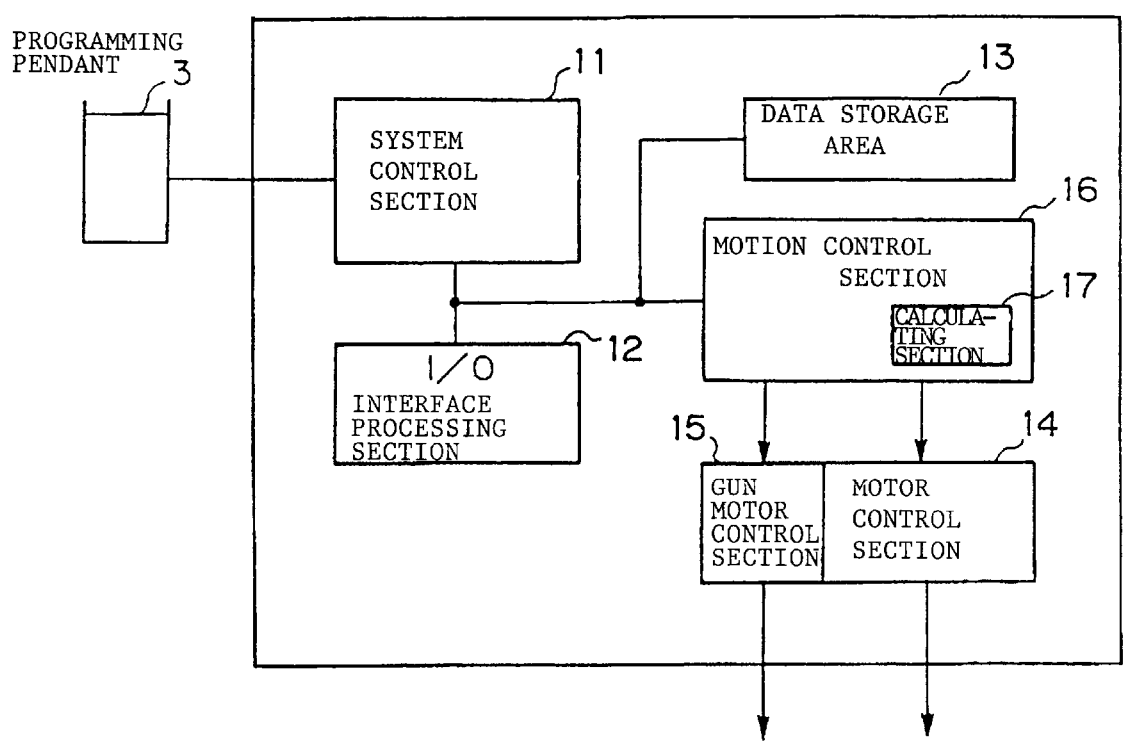
FIG. 2 is a block diagram of robot controlling unit 2.

As shown in FIG. 2, robot controlling unit 2, comprises system control section 11 for controlling the entire system based on teach data set at programming pendant (teaching box) 3, I/O interface processing section 12 for processing input/output of signals of computers or the like, data storage area 13, motor controlling section 14 for controlling a motor of respective axes of robot 1, gun motor controlling section 15 for controlling gun-axis servomotor 7 of moving-side electrode 6, and motion control section 16 for calculating instructions for respective axes of robot 1 from instructions for robot 1 provided by system control section 11 to supply the calculated instructions to motor control section 14 and for generating instructions for gun motor control section 15. Motion control section 16 includes calculating section 17.

Figure 3:
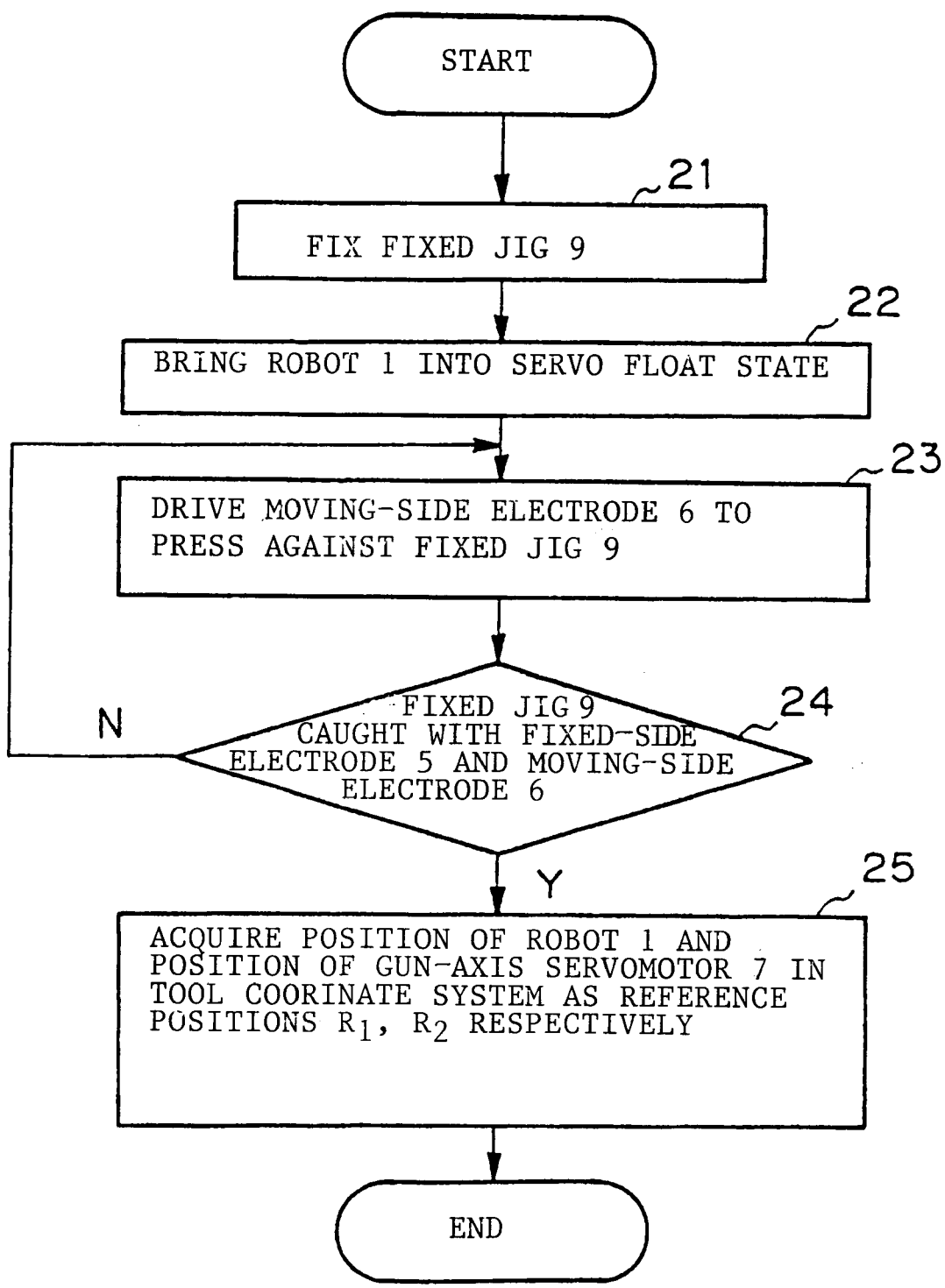
FIG. 3 is a flow chart illustrating processes for deriving reference positions of robot 1 and gun axis servomotor 7.
Figure 4:
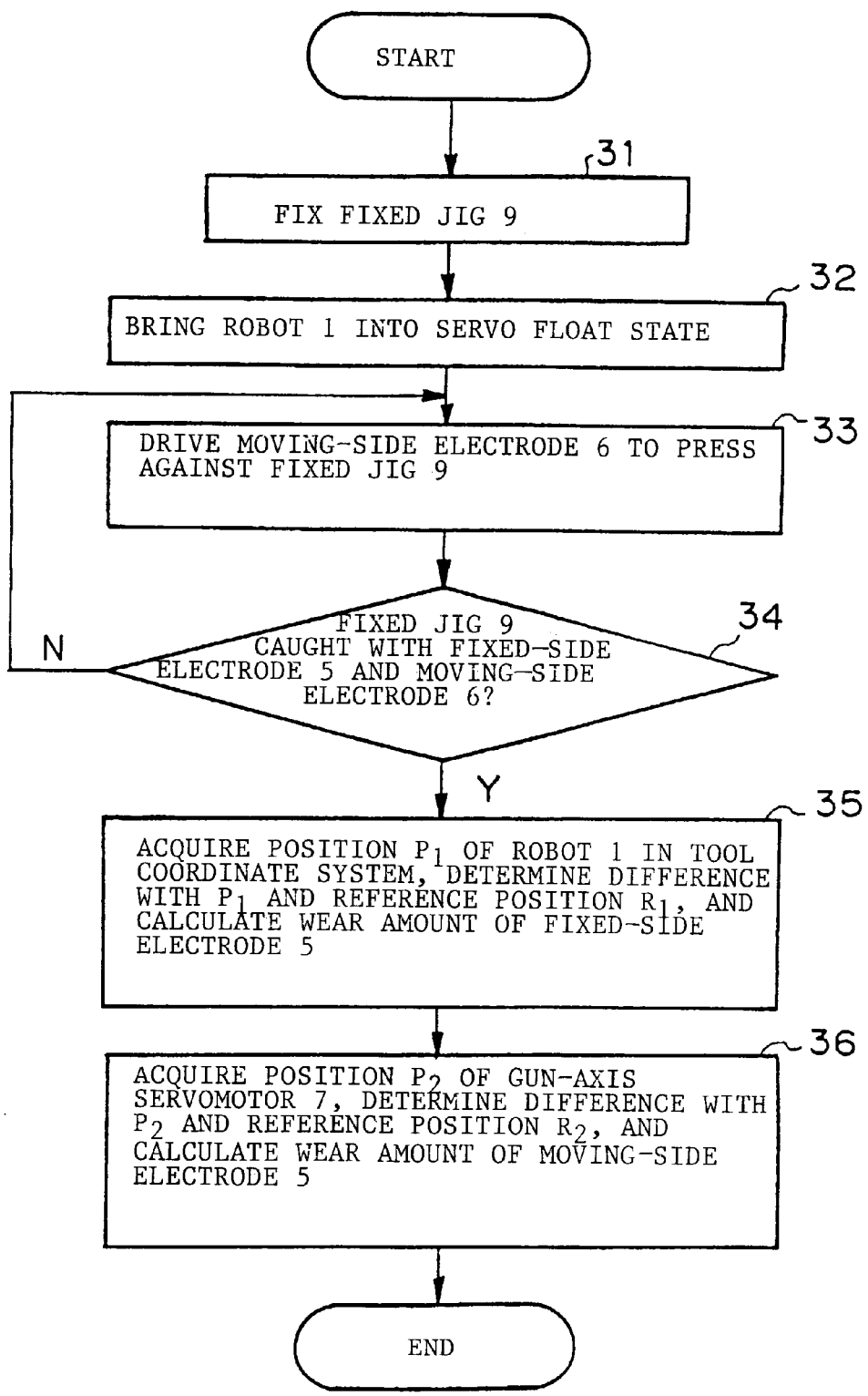
FIG. 4 is a flow chart illustrating processes for deriving wear amounts of fixed-side electrode 5 and moving-side electrode 6.

Next, the operation of the embodiment will be described with reference to FIG. 3 to FIG. 5.

First, as shown in FIG. 5a, plate-shaped fixed jig 9 is fixed between fixed-side electrode 5 and moving-side electrode 6 and the positions of fixed-side electrode 5 and moving-side electrode 6 are taught (step 21). Next, 6 axes of robot 1 are brought into a servo float state (a state where the servomotor produces a motor torque only for compensating for the own weight of robot 1) such that the end of the arm of robot 1 moves only in the direction in which moving-side electrode 6 moves by an external force (step 22). Gun axis servomotor 7 is driven by gun motor control section 15 with a constant speed control to lower moving-side electrode 6 as shown in FIG. 5b, and after moving-side electrode 6 comes into contact with fixed jig 9, it is pressed against fixed jig 9 with a motor torque set for fixed jig 9 (step 23). At this time, since the force transmitted to moving-side electrode 6 through the ball screw by gun axis motor 7 is greater than the holding force of the servomotor on robot 1 side, the arm end of robot 1 moves upward, i.e. fixed-side electrode 5 is elevated, to hold fixed jig 9 with moving-side electrode 6 and fixed-side electrode 5 as shown in FIG. 5c (step 24). At this time, the positions of the respective axes of robot 1 are detected by motor control section 14 and converted to data in a tool coordinate system (coordinate system in which an effective direction of a tool attached to an end of a flange of the robot is the z axis) at processing section 17 in motion control section 16. The converted data is stored as reference data $R_1$ in data storage area 13. The position of gun axis servomotor 7 is detected by gun motor control section 15 and stored as reference data $R_2$ in data storage area 13 through motion control section 16 (step 25). Thereafter, as shown in FIG. 5d, the holding of fixed jig 9 with pressure with moving-side electrode 6 and fixed-side electrode 5 is released to return moving-side electrode 6 and fixed-side electrode 5 to the position in FIG. 5a.

Next, when welding is actually performed, similarly to steps 21 to 24 (step 31 to 34), the positions of the respective axes of robot 1 are detected by motor control section 14 and converted to data $P_1$ in the tool coordinate system at calculating section 17, and the difference between $P_1$ and reference position $R_1$ stored in data storage area 13 is determined at calculating section 17 and is stored in data storage area 13 as a wear amount of fixed-side electrode 5 (step 35). Similarly, position $P_2$ of gun axis servomotor 7 is detected by gun motor control section 15 and the difference between $P_2$ and reference position $R_2$ stored in data storage area 13 is determined at calculating section 17. The difference thus determined is multiplied by the resolution in gun axis servomotor 7 to store the result in data storage area 13 as a wear amount of moving-side electrode 6 (step 36).

Thereafter, fixed-side electrode 5 is moved toward moving-side electrode 6 by a distance corresponding to its wear amount, while moving-side electrode 6 is moved toward fixed-side electrode 5 by a distance corresponding to (a wear amount of fixed-side electrode 5 plus a wear amount of moving-side electrode 6) to perform correction for wear of the electrodes of C-shaped welding gun 4 (which eliminates the need of an equalizing operation), and welding is performed.

It should be noted that the present invention is applicable to an X-shape servo welding gun (a spot gun having a supporting point as in scissors in which one is driven with a motor and the other is used for applying pressure). Additionally, a coordinate system other than the tool coordinate system may be used to convert the position of robot 1.

Furthermore, supposing fixed jig 9 to be a workpiece, the operations shown in FIG. 5a to FIG. 5d (except for the detection of positions) are performed at a higher speed during welding, thereby allowing the robot itself to realize an operation similar to that of an equalizing mechanism. In this case, an air cylinder may be used instead of gun axis servomotor 7.

What is claimed is:

1. A method of detecting wear amount of welding gun electrodes in a welding robot having a welding gun attached to an end of its robot arm for holding an object to be welded with a fixed-side electrode and a moving-side electrode opposite to the fixed-side electrode and moving driven by a gun-axis servomotor to hold with pressure the object to be welded, said method comprising the steps of:

fixing a plate-shaped jig between the fixed-side electrode and the moving-side electrode;

controlling, before either of the electrodes is worn, the robot such that the end of the arm moves by an external force only in the direction moving-side electrode moves, then moving the moving-side electrode toward the jig, and after the moving-side electrode comes into contact with the jig, pressing the moving-side electrode against the jig with a constant force such that the end of the arm moves in a direction opposite to the direction in which the moving-side electrode moves with a counterforce;

acquiring a position of the robot and a position of the gun axis servomotor in a predetermined coordinate system as reference positions respectively when the jig is held between the moving-side electrode and the fixed-side electrode;

acquiring thereafter a position of the robot and a position of the gun-axis servomotor in the coordinate system in a similar manner; and calculating a wear amount of the fixed-side electrode and a wear amount of the moving-side electrode from a difference between the present position of the robot and the reference position of the robot and a difference between the present position of the gun axis servomotor and the reference position of the gun axis servomotor, respectively.

2. A welding method performed by a welding robot having a welding gun attached to an end of its robot arm for holding an object to be welded with a fixed-side electrode and a moving-side electrode opposite to the fixed-side electrode and moving driven by a servomotor or an air cylinder to hold with pressure the object to be welded, said method comprising the steps of:

fixing a workpiece between the fixed-side electrode and the moving-side electrode;

controlling the robot such that the end of the arm moves with an external force only in the direction the moving-side electrode moves, then moving the moving-side electrode toward the workpiece, and after the moving-side electrode comes into contact with the workpiece, pressing the moving-side electrode against the workpiece with a constant force such that the end of the arm moves in a direction opposite to the direction in which the moving-side electrode moves with a counterforce;

causing the workpiece to be held between the moving-side electrode and the fixed-side electrode and performing welding; and releasing the holding with pressure for the workpiece to return the moving-side electrode to its original position, wherein those steps are performed quickly.

* * * * *